United States Patent [19]

Slinger

[11] 3,950,983
[45] Apr. 20, 1976

[54] AIR LEAK DETECTOR

[75] Inventor: William R. Slinger, Kearney, N.J.

[73] Assignee: Treadwell Corporation, New York, N.Y.

[22] Filed: Feb. 24, 1975

[21] Appl. No.: 552,134

Related U.S. Application Data

[63] Continuation-in-part of Ser. No. 376,745, July 5, 1973, Pat. No. 3,882,715.

[52] U.S. Cl. .................................... 73/46; 73/49.8
[51] Int. Cl.² ......................................... G01M 3/28
[58] Field of Search ............ 73/46, 49.8, 49.6, 49.5, 73/49.1, 40; 138/90, 89, 93

[56] References Cited

UNITED STATES PATENTS

| | | | |
|---|---|---|---|
| 2,342,616 | 2/1944 | O'Brien | 73/46 |
| 2,507,124 | 5/1950 | Stillinger | 73/49.6 |
| 3,029,630 | 4/1962 | Cummins | 73/46 |

Primary Examiner—Richard C. Queisser
Assistant Examiner—Joseph W. Roskos
Attorney, Agent, or Firm—Jordan B. Bierman; Linda Bierman; Kenneth J. Stempler

[57] ABSTRACT

An apparatus for detecting leaks in a joint between a tube sheet and a tube end fitted into an opening in the sheet comprising a barrel having a near end adjacent one side of said sheet; sealing means between said near end and said face, said sealing means surrounding said joint, a draw rod axially mounted in said barrel for reciprocal motion toward and away from said sheet, one end of said rod adapted to project into said tube, means for reciprocating said rod, a radially expandable plug adjacent said one end, the end of said rod being spaced from plug, resilient means between the end of said rod and said plug, means for expanding said plug radially when said rod is moved in a first direction away from said sheet, a chamber in said barrel adjacent said near end, means for introducing vacuum or pressure into said chamber, a gauge in communication with said chamber whereby the pressure in said chamber can be measured, means for isolating said chamber from the source of said vacuum or pressure.

5 Claims, 1 Drawing Figure

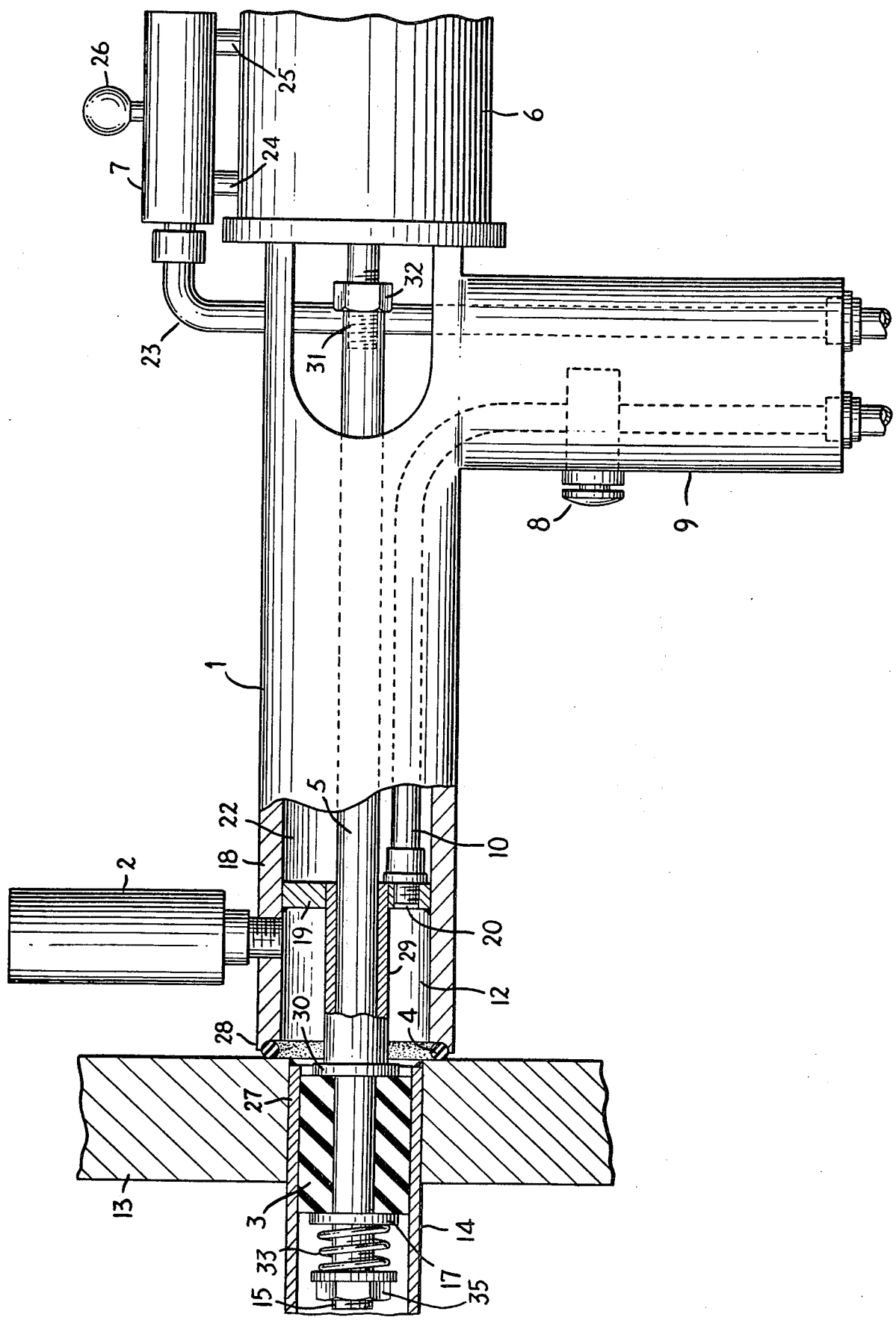

AIR LEAK DETECTOR

This application is a continuation-in-part of application Ser. No. 376,745 filed July 5, 1973, now U.S. Pat. No. 3,882,715 issued May 13, 1975.

The present invention is directed to a method and apparatus for detecting air leaks; more specifically, for testing steam condenser tubes at the junction between the ends of the tubes and tube sheet.

In certain types of condensers, particularly steam condensers, it is necessary that the tubes be welded to a generally planar supporting member called a tube sheet. In order that the condenser operate properly, a gas tight seal must be formed at the joint between the tube end and the tube sheet. The weld is usually applied at the junction between the outside periphery of the tube and the inside periphery of the opening on the tube sheet.

Once this has been done it is necessary to test each weld in order to insure that it is gas tight. The prior art method for doing this is to make the entire condenser housing air tight by installing temporary enclosures to form an air tight chamber of which the tube sheets comprise the end walls. The pressure inside the chamber is then raised, for example 5 psi, by introduction of compressed air. The welds are then checked for leaks by applying a solution of detergent and water around each weld and inspecting for air bubbles. The presence of such bubbles would indicate a leak.

It is among the objects of the present invention to provide an improved substitution for the aforementioned prior art procedure.

It is also among the objects of this invention to eliminate the necessity of creating a gas tight chamber in order to test the welds.

It is further among the objects of this invention to provide a detection method and apparatus which will measure directly the tightness of the joints being tested.

In the accompanying drawing constituting a part hereof and which like reference characters indicate like parts, the single FIGURE is a diagrammatic view partly in section showing the improved apparatus of the present invention.

In practicing the present invention, there is provided a body 1 having a barrel 18 and a hand grip 9. Barrel 18 is provided with bore 22 in which is mounted barrel plate 19. The joint between barrel plate 19 and the inside wall of bore 22 is gas tight. A vacuum hole 20 communicating with passage 10 is provided in plate 19. Draw rod 5 is mounted on support 29 and projects out of bore 18. One end 15 of rod 5 projects into tube 14 and carries expandable plug 3 adjacent the end thereof.

Expandable plug 3 is located between a washer 17 and retainer 30. Washer 17 is loosely mounted on rod 5 and adjacent the expandable plug 3. The rod 5 extends for a selected distance past the washer 17 and is capped by a lock nut and washer combination 35. A spacer spring, preferably of the compression type, is mounted between the washer 17 and lock nut and washer combination 35 for reasons to be fully explained herein below.

Retainer 30 is fixed with relation to barrel 18, as for example, by attaching it to support 29. Resilient gasket 4 is mounted on near end 28 of barrel 18 and is adapted to form an air tight seal between near end 28 and the outer face of tube sheet 13.

Vacuum gauge 2 is mounted on barrel 18 and is in communication with chamber 12 formed by the inner wall of barrel 18, barrel plate 19, resilient gasket 4, tube sheet 13 and tube end 27.

Draw rod 5 adapted for axial reciprocal movement toward and away from tube end 27. The means for causing this motion preferably comprises air cylinder 6 containing a piston therein. One end of the piston is attached to remote end 31 of rod 5 by coupling nut 32. Air pressure line 23 communicates with air control valve 7. Movement of air control handle 26 permits air flowing through line 23 to be selectively introduced into air cylinder 6 through withdrawal air passage 24 or projection air passage 25. Thus by introducing air through withdrawal passage 24 the piston is forced away from barrel 18 and causes rod 5 to move in the same direction.

The foregoing device is a convenient and accurate means for testing a joint for air leaks. The most common type of joint to be tested by the present apparats comprises a tube 14 having a tube end 27 which fits into an opening in tube sheet 13. The end 27 is welded to sheet 13 near the outer surface thereof.

One end 15 of draw rod 5 is inserted into tube 14 until resilient gasket 4 seals against the outer face of sheet 13. Fluid is introduced through line 23 and withdrawal passage 24 to cause the piston to move away from barrel 18. This causes the resilient plug 3 to be compressed between the washer 17 and support 29, causing resilient plug 3 to expand and seal against the inner wall of tube 14, preferably with little or no attendant compression of spring 33. The plug 3 is contained by washer 17, support 29 and tube wall 14, grips the tube wall, and is restricted from further expansion.

Continued action of the piston of air cylinder 6 on draw rod 5 causes compression spring 33 to be compressed, thereby imparting axial movement to barrel 18 to move it toward tube sheet 13. This causes the barrel to compress resilient gasket 4 to form a tight seal between the barrel and tube sheet.

It is conceivable that operating personnel may not properly position the resilient gasket 4 against the outer surface of tube sheet 13. Should this occur, it is not necessary with the present invention to remove the device and then reinsert it. Specifically, the space between washer 17 and lock nut and washer combination 33 allows the draw rod 5 to continue to be moved, against the force of spring 33, even after the expandable plug 3 has sealed against the walls of tube 14. If resilient gasket 4 is not firmly against tube sheet 13, the entire housing 18 will then translate forwards to move the resilient gasket 4 against the tube sheet. Any desired distance may be provided between washer 17 and lock nut and washer combination 35, as long as it is sufficient to allow the housing 18 to translate somewhat toward the tube sheet. For most commercial applications, a distance between washer 17 and the lock nut and washer of about 1¼ inches has been found sufficient.

Control valve 8 is then opened and fluid is permitted to pass through fluid passage 10. Preferably, fluid is evacuated from barrel 12 to form a vacuum therein. After chamber 12 has been evacuated, control valve 8 is then closed and gauge 2 is read. Should there be any leak at the joint being tested, the vacuum in chamber 12 will decrease and this can be easily detected by gauge 2.

Clearly, the apparatus would function equally well if air pressure were introduced into chamber 12 or if another fluid were used. Similarly other changes and variations in the apparatus and method may be made without departing from the scope or spirit thereof. For example, any means can be used for withdrawing the rod in order to cause the plug to expand. Withdrawal can take place by hand rather than by use of a hydraulic cylinder. The plug can be made inflatable to eliminate the necessity for reciprocation of the rod.

Although only a limited number of embodiments of this invention have been specifically described, the invention is nonetheless to be broadly construed and not to be limited except by the character of the claims appended hereto.

What is claimed is:

1. A device for detecting leaks in a joint between a tube sheet and a tube end fitted into an opening in said sheet comprising a barrel having a near end adjacent one side of said sheet; sealing means between said near end and said face, said sealing means surrounding said joint, a draw rod axially mounted in said barrel for reciprocal motion toward and away from said sheet, one end of said rod adapted to project into said tube, means for reciprocating said rod, a radially expandable plug adjacent said one end, and resilient means mounted between said plug and said one end of said rod, means for expanding said plug radially when said rod is moved in a first direction away from said sheet, said rod being movable in said first direction against said resilient means after said plug has expanded, to urge the barrel against said tube sheet, a chamber in said barrel adjacent said near end, means for introducing vacuum or pressure into said chamber, a gauge in communication with said chamber whereby the pressure in said chamber can be measured, means for isolating said chamber from the source of said vacuum or pressure.

2. A device according to claim 1 wherein said means for expanding said plug comprises a retainer axially immovable with respect to said barrel and axially movable with respect to said rod, retaining means on said rod adjacent said one end and axially immovable with respect thereto, said resilient means being located between said retaining means and said plug.

3. A device according to claim 1 wherein said means for introducing vacuum or pressure comprises a fluid passage extending between said chamber and a source of said vacuum or pressure.

4. A device according to claim 3 wherein said means for isolating said chamber comprises a control valve, said valve having a first position in which flow is permitted through said fluid passage and having a second position in which flow is not permitted through said passage.

5. A device accordng to claim 1 wherein said means for reciprocating said rod comprises a cylinder, a piston in said cylinder, means for selectively introducing a fluid on either side of said piston, said piston being attached to the end of said rod remote from said near end of said barrel.

* * * * *